United States Patent [19]
Buescher et al.

[11] Patent Number: 5,465,796
[45] Date of Patent: Nov. 14, 1995

[54] SHANK ASSEMBLY WITH KNOCK-ON SWEEP

[75] Inventors: Melvin H. Buescher, Urbandale; David H. Bucher, Des Moines, both of Iowa

[73] Assignee: Deere & Company, Moline, Ill.

[21] Appl. No.: 232,541

[22] Filed: Apr. 22, 1994

[51] Int. Cl.$^6$ ........................................ A01B 39/20
[52] U.S. Cl. .................. 172/762; 172/730; 172/773
[58] Field of Search ...................... 172/730, 749, 172/750, 751, 753, 762, 269, 271, 705; 411/338, 339, 508–510

[56] References Cited

U.S. PATENT DOCUMENTS

| | | | |
|---|---|---|---|
| 3,700,038 | 10/1972 | Essex | 172/705 X |
| 3,773,114 | 11/1973 | Griffin . | |
| 3,792,736 | 2/1974 | Gondeiro . | |
| 4,392,278 | 7/1983 | Mugglestone | 411/510 X |
| 4,580,639 | 4/1986 | Johnson | 172/730 |
| 4,585,211 | 4/1986 | Griffin . | |
| 4,638,868 | 1/1987 | Johnson et al. | 172/762 |
| 4,683,958 | 8/1987 | Malinowski et al. . | |
| 4,697,646 | 10/1987 | Johnson et al. . | |
| 4,871,032 | 10/1989 | Malinowski et al. . | |
| 5,000,267 | 3/1991 | Harrell | 172/271 X |
| 5,154,239 | 10/1992 | Harrell et al. | 172/269 |
| 5,259,461 | 11/1993 | Cochrane | 172/730 |

FOREIGN PATENT DOCUMENTS

| | | | |
|---|---|---|---|
| 1020694 | 2/1966 | United Kingdom | 411/510 |
| 2249804 | 5/1992 | United Kingdom | 411/339 |

*Primary Examiner*—Dennis L. Taylor
*Assistant Examiner*—Frederick L. Lagman

[57] ABSTRACT

An agricultural shank assembly includes an edge-bent standard having an integral tool-receiving end which is tapered to provide a self-locking fit for a matching sweep. A non-corroding plastic pin inserted through a hole in the sweep and through an elongate hole in the end of the standard retains the sweep in position and prevents the sweep from jarring loose. The elongate hole in the standard accommodates considerable variation in the tapered end and the mating sweep portion. The pin is easily shearable by a hammer blow to the sweep during sweep replacement.

13 Claims, 2 Drawing Sheets

SHANK ASSEMBLY WITH KNOCK-ON SWEEP

BACKGROUND OF THE INVENTION

1. Field of the Invention

The present invention relates generally to tillage tools and, more specifically, to a standard assembly with a knock-on sweep and structure for preventing the sweep from falling off the shank.

2. Related Art

Standard assemblies for implements such as chisel plows and field cultivators typically include an upright shank pivotally connected at its upper end to a frame bracket and extending downwardly to a tool-receiving end which mounts a shovel or sweep. Previously available mounting structure included bolts extending through aligned holes in the tool and the shank to secure the tool. When the tool in such an assembly has to be replaced because of wear or damage, the bolts must be removed. Wear and corrosion of the bolts substantially hinders removal and often makes the replacement a difficult and time-consuming task.

Several solutions to the problem of easily and quickly replacing worn elements such as sweeps on shanks have been developed over the years, including the use of a tapered adapter brackets fastened to the end of a standard and providing a self-locking fit with a matching taper on the sweeps. However, such devices have suffered from one or more problems, including need for additional parts and the loss of sweeps during transport if the tapers on the adapters and sweeps do not match correctly or if the tool is not mounted with sufficient force. In an attempt to try to avoid the problem of sweeps falling off the shanks in quick mount arrangements, some manufacturers have offered a retaining clip in the form of a sheet metal stamping with a spherical protrusion that fits into a hole in the sweep. However, the clip increases cost and the required number of parts, and an incorrect taper in either the shank adaptor or the sweep can prevent the protrusion from engaging the hole in the sweep to render the clip ineffective. Further, many of the tapered adaptor assemblies do not permit easy changeover to a conventional two-bolt mounting, an option that some farmers wish to have readily available to assure a very sound mounting under certain conditions where a knock-on type of arrangement is inappropriate.

In many of the shank assemblies that have a quick attaching feature for mounting a tool on a shank, a relatively wide profile is presented along the shank and at the mounting location. Such a profile often results in unwanted residue disturbance and higher draft loads.

BRIEF SUMMARY OF THE INVENTION

It is therefore an object of the present invention to provide an improved shank assembly which overcomes most or all of the abovementioned problems. It is a further object to provide such an improved shank assembly which is relatively simple and inexpensive in construction and wherein a worn tool can be quickly and easily removed and replaced in a short period of time.

It is a further object of the present invention to provide an improved shank assembly having an easily attachable and removable tool. It is a further object to provide such an assembly which has a minimum number of components and eliminates need for add-on adapters or special retaining clips. It is still another object to provide such an assembly wherein tool loss during transport is virtually eliminated, even during periods of transport prior to the time the tools first operated in the soil.

It is yet a further object of the present invention to provide an improved shank assembly which has a narrow profile for less residue disturbance and lower draft loads. It is still another object to provide such an assembly wherein tools such as shovels and sweeps can be mounted either using self-locking boltless connections or a standard bolt connection, and wherein a simple, inexpensive, and reliable retaining device prevents tool loss during transport when the boltless connection is used, without hindering fast tool removal when necessary.

A shank assembly constructed in accordance with the teachings of the present invention includes an edge-bent standard with an integral tapered end for receiving a mating tapered attaching portion of a knock-on type of tool such as a sweep or shovel so that no adaptor in necessary and no special mounting hardware is required to maintain the tool on the shank. The tapered attaching portion, which is a relatively narrow wrap-around design that fits snugly to the shank, and the edge-bent standard provide a narrow combination of structure which results in less residue disturbance and lower draft loads than most conventional shank structures. The tool can be mounted or removed with several blows from a hammer in much less time than required for mounting or removal of a conventional tool with two mounting bolts. However, two holes are provided in the tapered end of the standard so that the user can alternatively mount spikes or shovels using the conventional two-bolt method, if desired.

To retain the tool on the end of the shank if the tapers on the shank and the tool do not provide a self-locking fit, a plastic, relatively easily sheared pin is inserted through a hole in the knock-on tool and through one of the holes in the tapered end of the shank, the selected hole being preferably elongated in shape to accommodate considerable variation the mating tapers. The pin provides positive retention for the tool, particularly prior to the first field-working operation when the tool has not yet been firmly seated on the tapered end. When the tool needs to be replaced, a firm blow from a hammer will cause the plastic pin to shear and permit the tool to be easily driven from the tapered end of the shank. A new tool is then driven on the tapered end, and a new plastic pin is installed. The plastic pin will not corrode, and is designed to stay in place during the life of the tool. Therefore, if for any reason the tool fails to lodge properly on the shank or is dislodged from the wedged-in-place position on the shank, the pin will prevent loss of the tool.

These and other objects, features and advantages of the present invention will become apparent to one skilled in the art upon reading the following detailed description in view of the drawings.

DETAILED DESCRIPTION OF THE DRAWINGS

Figure 1:
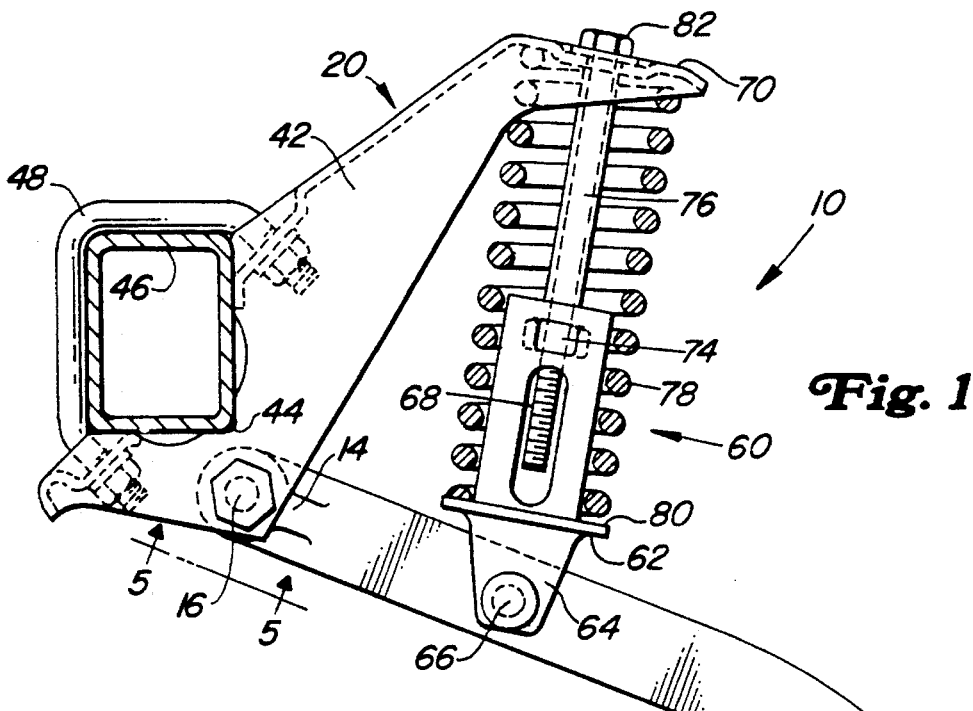
FIG. 1 is a side view of shank assembly constructed in accordance with the teachings of the present invention.

Referring now to FIG. 1, therein is shown a shank assembly 10 including an edge-bent shank 12 having an upper connecting end 14 pivotally connected by pivot structure 16 to a spring bracket assembly 20. The shank 12 extends downwardly and rearwardly from the end 14 to a central C-shaped portion 22. A lower wedge-shaped tool mounting end 24 is integral with the remainder of the standard 12 and extends downwardly and forwardly from the C-shaped portion 22. The end 24 terminates at a lowermost extremity 28.

Figure 3:
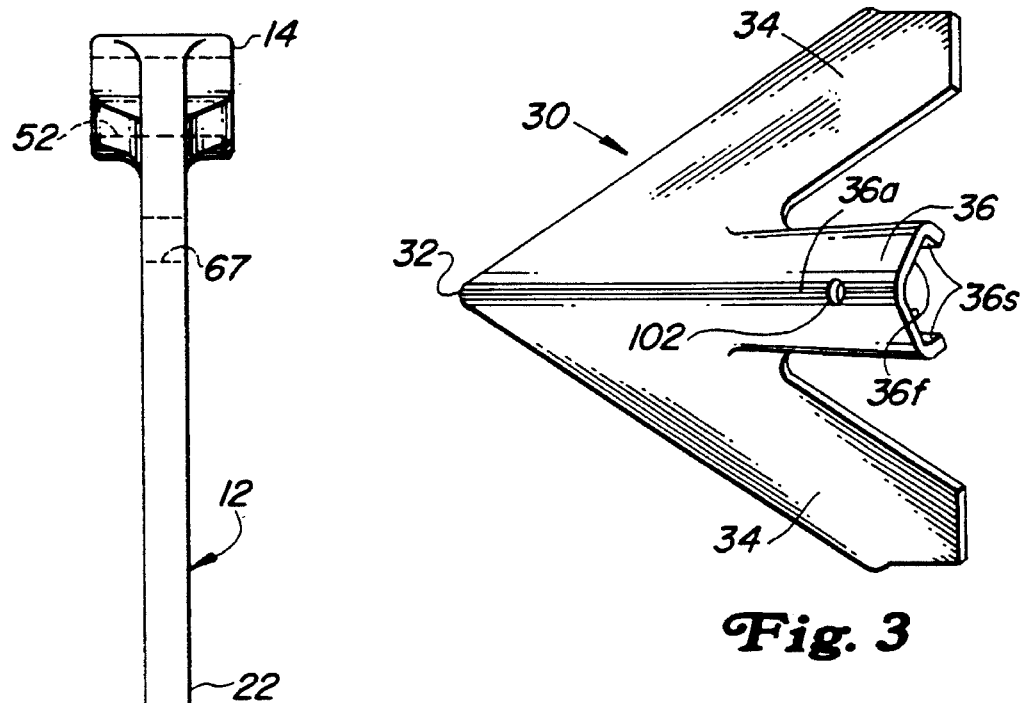
FIG. 3 is a top view of the tool utilized with the assembly of FIG. 1.

An earthworking tool 30, shown as a sweep in FIGS. 1 and 3, includes a forwardmost tip 32 and diverges outwardly and rearwardly from the tip to opposed wing portions 34. An attaching portion 36, which provides a wedge fit between the tool and the lower end 24 of the shank 12, projects rearwardly and upwardly between the wings 34 from the central portion of the sweep 30.

Figure 5:
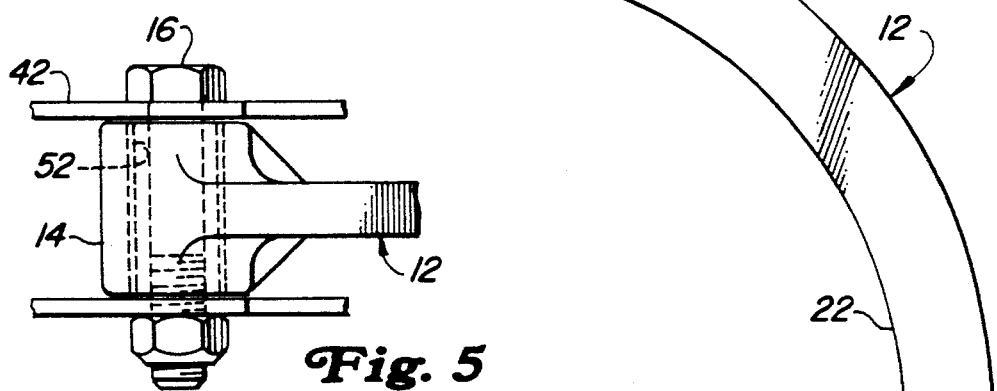
FIG. 5 is a view of the attaching portion of the shank and a portion of the shank attaching bracket taken generally long lines 5—5 of FIG. 1.

The bracket assembly 20 includes a downwardly and rearwardly opening channel-shaped bracket 42 having a notch 44 received against the rear and bottom walls of a transverse frame member 46 on an implement such as a chisel plow or field cultivator. A bolt assembly 48 extends around the frame member 46 and through the bracket 42 to secure the assembly 20 to the implement frame. The upper end 14 of the shank 12 is enlarged and is received between the sidewalls of the bracket 42 (FIG. 5). A transverse bore 52 extends through the end 14 and receives the pivot structure 16 which is shown as a bolt and bushing assembly. The end 14 preferably is an upset forging and is substantially wider than the edge-bent portion to provide lateral stability to the shank 12.

The bracket assembly 20 also includes upright downpressure spring structure 60 connected between the shank and the upper rearward end of the bracket 42. The structure 60 includes a lower bracket 62 with transversely spaced sidelegs 64 extending downwardly on either side of the shank 12 between the central portion 22 and the end 14 and pivotally connected thereto by a bolt 66 inserted through holes in the sidelegs and a hole 67 in the shank. An elongated bolt 68 is slidably received through a hole in a downwardly and slightly forwardly projecting spring abutment surface 70 in the bracket 42. The bolt 68 includes a lower threaded shank received by a nut 74 which is captured in the lower bracket 62. A tubular spacer 76 is placed over the upper end of the bolt shank. A spring 78 is compressed between an upwardly directed spring abutment surface 80 and the abutment surface 70 to bias the shank 12 downwardly. The bolt 68 includes an upper headed end 82 which contacts the top of the surface 70 to limit downward rocking of the shank 12 beyond the position shown in FIG. 1. The bolt 68 is turned until the spring 78 is compressed to the extent allowed by the tubular spacer 76.

Figure 2:
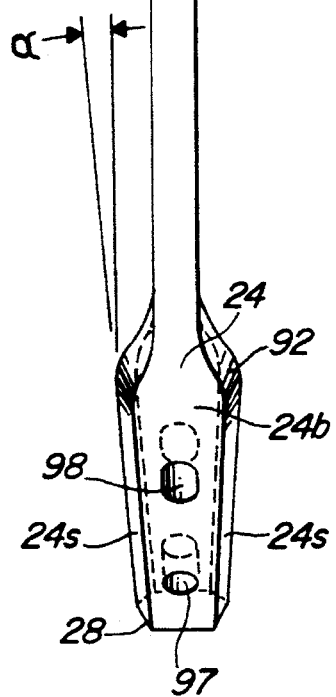
FIG. 2 is a rear view of the shank utilized in the assembly of FIG. 1.

The shank 22 has a generally constant and relatively narrow cross section from the end 14 to the end 24 where the sides diverge at a transition location 92 and the fore-and-aft dimension of the shank decreases substantially. The wedge-shaped end 24 has a cross section in the shape of a hexagon (FIG. 4) with a generally flat back side 24b, sidewalls 24s diverging in the forward direction from the back side, and forwardly and outwardly facing walls 24f extending to and terminating at a generally flat front surface which is parallel to the back side 24b. The walls 24s diverge outwardly in the upward direction at an angle alpha (FIG. 2) of slightly greater than 3.4 degrees. A lower hole 97 and a vertically elongated upper slot 98 located above the hole 97 extend through the flat front surface 24a.

Figure 4:
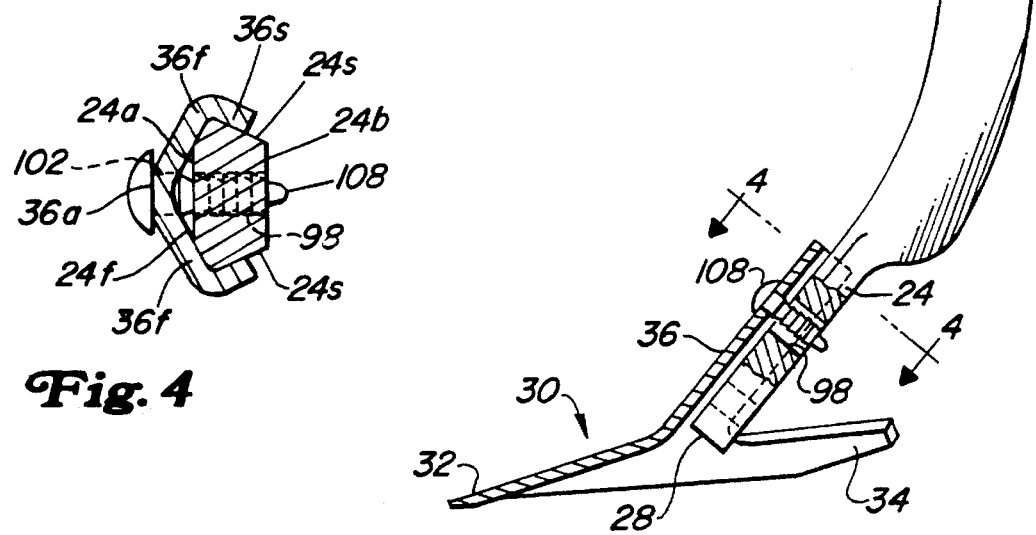
FIG. 4 is a view taken essentially along lines 4—4 of FIG. 1 and showing the wedge fit and shearable retaining structure for the tool.

The attaching portion 36 of the tool 30 has a wedge shape generally complimentary to the end 24 of the shank 12 and includes rearwardly directed faces 36f diverging from an apex 36a to downwardly and inwardly converging sides 36s which wrap partially around the end 24 as shown in FIG. 4 when the tool 24 is driven onto the end. The sides 36s have the same taper angle as the walls 24s. A hole 102 is provided in the attaching portion 36 and generally aligns with a portion of the slot 98 in the end 24 when the tool 30 is mounted on the shank 12.

To attach the tool 20, the top of the attaching portion 36 is slid upwardly over the lowermost extremity 28 of the shank end 24, and the lower portion of the tool is struck sharply two or three times by a hammer to wedge the portion 36 on the end 24. A plastic ratcheting pin 108 is inserted through the hole 102 and the slot 98 to prevent the tool 30 from falling off the shank 12 if for any reason the self-locking fit between the portion 36 and the end 24 is lost or fails to be established during mounting. The shank of the pin 108 provides an interference fit against the sides of the slot 98 so a nut or other separate locking member is unnecessary. Once the tool engages the soil, the self-locking fit is provided and/or enhanced. To remove the tool 34, the tool is driven downwardly from the end 24 by one or two sharp blows from a hammer. The pin 108 is easily shearable so that it does not hinder removal.

Having described the preferred embodiment, it will become apparent that various modifications can be made without departing from the scope of the invention as defined in the accompanying claims.

We claim:

1. A shank assembly adapted for forward movement through the soil to work the soil, the assembly comprising:

an upright shank having a lower tapered end narrowing in the downward direction, the tapered end including a hole;

an earthworking tool having a tapered attaching portion adapted for receipt by the tapered end to provide a self-locking fit between the tool and the shank as the tool is moved through the soil and the tool is urged in the upward direction on the tapered end, the tool including an aperture which generally aligns with the hole in the tapered end when the tool is received by the tapered end; and a pin insertable through the hole and aperture for temporarily maintaining the tool on the tapered end when the self-locking fit is not provided, wherein the pin is fabricated from an easily frangible material to facilitate downward removal of the tool from the tapered end without need to remove the pin from the hole and aperture.

2. The invention as set forth in claim 1 wherein the aperture is elongated to provide alignment with the hole for varying shank end and attaching portion tapers.

3. The invention as set forth in claim 1 wherein the pin is fabricated from a shearable plastic material to thereby facilitate shearing of the pin.

4. The invention as set forth in claim 1 wherein the pin includes a shank portion providing a nutless interference fit between the pin and the aperture to retain the pin in the hole and the aperture.

5. The invention as set forth in claim 1 wherein pin comprises a ratchet fastener fabricated from an easily shearable material.

6. The invention as set forth in claim 1 wherein the shank is edge-bent and includes a C-shaped central portion integral with the tapered attaching portion, and wherein the tool includes an attaching portion which wraps at least partially around the tapered attaching portion.

7. The invention as set forth in claim 6 wherein the shank further includes an upper portion having an upset forged attaching section having a width substantially greater than the width of the edge-bent shank, the attaching section including a transverse mounting hole.

8. The invention as set forth in claim 1 further comprising a second hole in the tapered end adapted for alternately bolting a sweep to the tapered end.

9. A shank assembly adapted for forward movement through the soil to work the soil, the assembly comprising:

an upright shank having a lower end, the lower end including a hole;

an earthworking tool having a mating attaching portion adapted for receipt by the lower end to provide a self-locking boltless fit between the tool and the shank as the tool is moved to a preselected position relative to the lower end, wherein movement of the tool forwardly through the soil urges the tool towards the preselected position, the tool having a tendency to move downwardly away from the preselected position when the shank assembly is transported with the shovel above the soil, the tool including an aperture which generally aligns with the hole in the lower end when the tool approaches the preselected position; and means for retaining the tool on the lower end of the shank when the tool is in a position offset from the preselected position wherein the self-locking boltless fit is not provided, the means for retaining including a selectively breakable member extending between the tool and the shank and limiting downward movement of the shovel away from the preselected position when the shovel is transported above the soil, the member being easily breakable under impact to permit the tool to be driven downwardly off the shank.

10. The invention as set forth in claim 9 wherein the breakable member comprises a one-piece device extending into the hole and the aperture for preventing the tool from moving off the lower end in the absence of a sharp impact while permitting movement of the tool to the preselected position.

11. The invention as set forth in claim 10 wherein the pin comprises a nutless ratcheting pin.

12. The invention as set forth in claim 9 wherein the breakable member comprises a non-corrodible one-piece pin.

13. The invention as set forth in claim 12 wherein the pin is fabricated from plastic.

* * * * *